United States Patent

[11] 3,607,362

[72] Inventor James B. Cormack, Jr.
 Oak Park, Ill.
[21] Appl. No. 824,696
[22] Filed May 14, 1969
[45] Patented Sept. 21, 1971
[73] Assignee Continental Can Company, Inc.
 New York, N.Y.

[54] PLASTISOL GASKET COMPOSITION
 6 Claims, No Drawings
[52] U.S. Cl. .................................................. 117/95,
 117/101, 117/161 R, 117/161 UZ, 260/23 XA,
 215/40, 264/268
[51] Int. Cl. ...................................................... B44d 1/08,
 B44d 1/00
[50] Field of Search ........................................... 215/40;
 260/87.7, 87.5, 23 X, 78.5 CL; 264/268; 117/95,
 161 R, 160 UZ

[56] References Cited
UNITED STATES PATENTS
| | | | |
|---|---|---|---|
| 2,835,926 | 5/1958 | Maier et al. ..................... | 264/268 |
| 3,046,237 | 7/1962 | Rosenfelder et al. .......... | 260/23 |
| 3,462,331 | 8/1969 | Simons .......................... | 264/268 X |

Primary Examiner—Alfred L. Leavitt
Assistant Examiner—Edward G. Whitey
Attorneys—Paul Shapiro, Joseph E. Kerwin and William A. Dittmann ABSTRACT: Closure caps are lined with plastisol compositions which exhibit low orders of gas transmission, the compositions being comprised of a carboxyl containing vinyl chloride polymer and an epoxidized unsaturated fatty oil.

PLASTISOL GASKET COMPOSITION

BACKGROUND OF THE INVENTION

1. Field of the Invention

This invention relates to new and improved closure member gasket compositions especially adapted for effecting a hermetic seal on a product container and more particularly, the present invention relates to gasket lining compositions of the plastisol type.

2. The Prior Art

The use of polyvinyl chloride base plastisol gasket and liner compositions for closure caps for glass containers is well known to the art, as for example, U.S. Pat. No. 2,528,506 to Foye, dated Nov. 7, 1950, U.S. Pat. No. 2,874,863 to Unger et al., dated Feb. 24, 1959, and U.S. Pat. No. 3,283,936, to Kehe et al., dated Nov. 8, 1966.

Commercially satisfactory gasket or liner compositions for closure caps must exhibit a number of critical properties, making them highly specialized formulations. While certain polyvinyl chloride base basket or liner compositions have already met with very substantial commercial success, there are even greater demands for such compositions having improved properties and characteristics.

Generally speaking, it has been found that most monomeric and polymeric plasticizers which are added to polyvinylchloride resins to impart adequate flexibility and resiliency thereto are readily extracted by fatty or oily-type substances and tend to increase the gas permeation characteristics (i.e., lower the resistance to gas transmission) of the gaskets or liners formed therefrom. Low oxygen permeability is desirable in food containers for such comestibles as processed meats, and fatty or oily foods to prevent discoloration, oxidation and rancidity.

SUMMARY OF THE INVENTION

In accordance with the present invention, there is provided a plastisol composition which can be readily applied and cross-linked at fusion (i.e., curing or fluxing) temperatures to provide gaskets and liners for closure caps which exhibit low orders of gas transmission, the plastisol composition being comprised of a vinyl chloride polymer having an inherent viscosity greater than 0.8 and containing reactive carboxyl groups in the polymer structure dispersed in an epoxidized unsaturated fatty oil.

PREFERRED EMBODIMENTS

The term "carboxyl containing vinyl chloride polymers" as used herein includes within its meaning copolymers of vinyl chloride with a copolymerizable ethylenically unsaturated carboxylic acid comonomer, such as maleic acid, as well as copolymers containing a third ethylenically unsaturated copolymerizable monomer such as vinyl acetate, acrylonitrile, vinylidene chloride, in combination with the vinyl chloride and the carboxylic acid monomer.

Generally, the vinyl chloride component of the carboxyl containing vinyl chloride polymer is present in the range of about 85 percent to about 99 percent by weight of the copolymer and the copolymerizable carboxylic acid monomer is present in the range of about 1 percent to 5 percent. The third copolymerizable monomer if employed is present in the copolymer in the range of about 1 percent to 15 percent by weight.

The carboxyl containing vinyl chloride polymer resins used to prepare the plastisol compositions of the present invention are prepared by means well known to the art and are available commercially. An especially desirable commercially available carboxyl containing vinyl chloride copolymer is Geon 130X17 which is an emulsion polymerized vinyl chloride/maleic anhydride copolymer available in the form of a white powder from the B. F. Goodrich Chemical Company having an inherent viscosity (ASTM D-1243-60) of 1.40 (equivalent to a molecular weight of about 93,000) and a carboxyl content of 1.67 grams per 100 grams of resin, 100 percent of the particles passing through a 200 mesh screen.

It is an essential and critical feature of the present invention that the carboxyl containing vinyl chloride polymers used in the preparation of the plastisol compositions of the present invention have an inherent viscosity greater than 0.8 when measured in accordance with ASTM D-1243-60 Method A, i.e., the relative viscosity of a 0.2 g./100 ml. solution of the resin in cyclohexanone at 30° C. An inherent viscosity of 0.8 is equivalent to a molecular weight of about 50,000. Preferably, for use in the present invention, the inherent viscosity of the carboxyl containing vinyl chloride copolymer is in the range of about 1.2 to 1.5, i.e., a molecular weight range between about 80,000 and 100,000.

If it is attempted to prepare a plastisol composition from an epoxidized unsaturated fatty oil plasticizer and a carboxyl containing vinyl chloride polymer having an inherent viscosity substantially less than 0.8, excessive swelling or solvation of the carboxyl containing vinyl chloride polymer occurs at normal room temperature resulting in the formation of a solid gel. A plastisol composition solvated in this manner is generally unworkable at room temperatures and is unsuitable for gasket lining operations where a fluid composition is required for the lining operations as in spin lining.

In the plastisol compositions of the present invention, the carboxyl containing vinyl chloride polymers having an inherent viscosity greater than 0.8 are insoluble in the epoxidized oil plasticizer at room temperature, but become soluble therein at elevated temperatures.

No solvation problems are encountered with the plastisol compositions of the present invention. The plastisol compositions of the present invention remain in a fluid state when stored at room temperature. The plastisol when applied to the closure surface is in a fluid state consisting of discrete particles. On the application to the closure at elevated temperatures, e.g., 300° to 500° F., the discrete resin particles fuse into a continuous, impermeable film.

The epoxidized unsaturated fatty oils which may be used in the preparation of the plastisol compositions of the present invention include epoxidized soya bean oil, epoxidized linseed oil, or epoxidized safflower oil. The epoxidized unsaturated fatty oils have several oxirane groups in an internal open chain portion of the molecule and are substantially free of terminal oxirane groups. The oxirane group is introduced by well-known methods into the fatty alkyl portion of the unsaturated fatty alkyl molecule across carbon-to-carbon linkages formerly occupied by unsaturated bonds. For example, the oils may be epoxidized by any of the conventional methods involving percarboxylic acids. Epoxidized soya bean oil has a maximum oxirane content of about 7 percent, epoxidized safflower oil about 7.5 percent and epoxidized linseed oil about 9 percent. Because of their high oxirane contents, these materials readily cross-link with the reactive carboxyl containing vinyl chloride polymer resins during the fluxing stage of plastisol application to form highly cross-linked gasket compositions which have correspondingly improved resistance to extraction by fatty substances and lower gas transmission properties.

Gasket and liner compositions made in accordance with the present invention generally consist primarily of the high molecular weight carboxyl containing vinyl chloride polymer resin and the epoxidized unsaturated fatty oil. In fact, these two constituents will constitute at least about 90 percent by weight of the compositions with the carboxyl containing vinyl chloride polymer resin being present in an amount at least equal to the epoxidized unsaturated fatty oil and generally somewhat in excess of the epoxidized oil.

The following is a general formulation of a gasket or liner composition made in accordance with this invention.

GENERAL FORMULATION

| | Parts by weight |
|---|---|
| Carboxyl containing vinyl chloride polymer resin | 100 |
| Epoxidized unsaturated fatty oil | 50–100 |
| Pigment | 1–5 |
| Lubricant | 1–7 |
| Stabilizer | 1–5 |

Pigments that can be used in the preparation of the plastisol compositions of the present invention include titanium dioxide and a zinc oxide. The pigments are included in the plastisol compositions for opaqueness and color.

Lubricants are normally included in the plastisol compositions in order to impart proper torque values in lining caps of the type that have to be rotated, (e.g., lug or screw caps to be removed). Suitable lubricants include fatty acids such as stearic, and oleic acid, silicone oils such as dimethyl polysiloxane, and methyl hydrogen polysiloxane.

A stabilizer is included in the plastisol to improve the resistance of the carboxyl containing vinyl chloride copolymer resin to the deleterious effects of light, oxygen and heat. Suitable stabilizer materials are the so-called "acid acceptor" compounds which are capable of reacting with and neutralizing any hydrogen chloride which might split off from the carboxyl containing vinyl chloride copolymer resin. Examples of stabilizers which can be employed are calcium stearate, zinc stearate, magnesium stearate, aluminum stearate, calcium ricinoleate, zinc ricinoleate, calcium laurate, barium laurate, and other fatty acid soaps of these metals.

The plastisol compositions of the present invention are prepared by simply blending the ingredients in the desired proportions.

The plastisol may be deposited in closure shells by various known techniques, one of the most convenient being the so-called spin-lining technique wherein the plastisol composition in an uncured, pastelike condition is squirted from one or more nozzles into the closure shells which are turned upside down on a chuck rotating at high speed. Due to centrifugal force, the sealing liner material will assume the desired contour and shape. After being thus deposited or "flowed-in," the liners are cured by a heating operation according to known procedures and using known equipment. The cured caps with the gaskets or liners in place are fused (fluxed) by baking the shells at temperatures ranging from 300° to 500° F., preferably near 400° F., for 1 to 10 minutes, depending upon the thickness of the liner.

A representative gasket and liner formulation made in accordance with the present invention is given in the Table below, and for purposes of comparison, a corresponding composition formulated with a polyvinyl chloride resin which does not contain carboxyl groups is included in the Table. The Table also contains data on the physical properties of the compositions.

TABLE
[Amount (parts by weight)]

| Component | Plastisol composition Number | | |
|---|---|---|---|
| | A | B | C |
| Polyvinyl chloride (inherent viscosity 1.27) | 100 | | |
| Vinyl chloride/maleic acid copolymer, carboxy acid content 1.67 g./100 grams resin (inherent viscosity 1.40) | | 100 | 100 |
| Epoxidized soya bean oil (oxirane content 7%) | 100 | 100 | 80 |
| Titanium dioxide | 1 | 1 | 1 |
| Paraffin wax | .4 | .4 | .4 |
| Dimethyl polysiloxane (350 centistokes) | 0.5 | 0.5 | 0.5 |
| Calcium and zinc stearate stabilizer | 1 | 1 | 1 |
| Gas transmission; specific permeability in air, $10^{-4}$ cu. ft./mil/sq. ft./24 hrs. at 30° C. (avg. of 2 values) | 19.28 | 12.02 | 9.01 |
| Physical properties, elongation, percent | 370 | 293 | 260 |
| Tensile | 1,410 | 1,693 | 1,840 |
| Hardness, Shore A | 60.6 | 65.0 | 77.3 |
| Specific gravity | 1.24 | 1.20 | 1.22 |
| Oil extraction (corn oil): Storage for 8 days: | | | |
| Percent change in weight | −7.93 | −4.50 | |
| Percent change in volume | −9.43 | −6.36 | |

From the foregoing table, it is apparent that plastisol gasket compositions prepared from mixtures of carboxyl containing vinyl chloride polymers and epoxidized unsaturated fatty oils in accordance with the present invention (Compositions B, C) exhibit a marked decrease in gas transmission when compared with a noncarboxyl containing vinyl chloride polymer having an almost equivalent molecular weight.

What I claim is:

1. A closure cap adapted for application to a container in sealing relation therewith, said cap having applied to an inner surface thereof a cross-linked gasket composition consisting essentially of a vinyl chloride polymer having an inherent viscosity in the range of greater than 0.8 to 1.5 and containing reactive carboxyl groups in the polymer structure and an epoxidized unsaturated fatty oil.

2. The closure cap of claim 1 wherein the vinyl chloride polymer has an inherent viscosity between 1.2 and 1.5.

3. The closure cap of claim 2 wherein the vinyl chloride polymer is a vinyl chloride/maleic acid copolymer.

4. The closure cap of claim 3 wherein the vinyl chloride/maleic acid copolymer contains about 1 to about 5 percent by weight maleic acid.

5. The closure cap of claim 3 wherein the epoxidized unsaturated fatty oil is epoxidized soya bean oil.

6. The closure cap of claim 1 wherein the gasket composition is comprised of 100 parts of carboxyl containing vinyl chloride copolymer and 50 to 100 parts of the epoxidized unsaturated fatty oil.